(12) United States Patent
Beryozkin

(10) Patent No.: US 8,959,631 B2
(45) Date of Patent: Feb. 17, 2015

(54) TRAFFIC SEGMENTATION IN PREVENTION OF DDOS ATTACKS

(71) Applicant: Microsoft Corporation, Redmond, WA (US)

(72) Inventor: Genady Beryozkin, Netanya (IL)

(73) Assignee: Microsoft Corporation, Redmond, WA (US)

(*) Notice: Subject to any disclaimer, the term of this patent is extended or adjusted under 35 U.S.C. 154(b) by 35 days.

(21) Appl. No.: 13/720,110

(22) Filed: Dec. 19, 2012

(65) Prior Publication Data

US 2014/0173725 A1 Jun. 19, 2014

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |

(52) U.S. Cl.
CPC .................. *H04L 63/1458* (2013.01)
USPC ........................................................ 726/22

(58) Field of Classification Search
CPC ............ H04L 63/1458; H04L 63/1441; H04L 63/1408; H04L 63/1416; H04L 63/1425
USPC ......................................................... 726/22
See application file for complete search history.

(56) References Cited

U.S. PATENT DOCUMENTS

| | | | |
|---|---|---|---|
| 2007/0076853 A1* | 4/2007 | Kurapati et al. ............. | 379/1.01 |
| 2010/0082513 A1* | 4/2010 | Liu ................................ | 706/46 |
| 2011/0019574 A1 | 1/2011 | Malomsoky et al. | |
| 2011/0219445 A1* | 9/2011 | Van Der Merwe et al. ..... | 726/22 |
| 2012/0185503 A1 | 7/2012 | Chamberlain et al. | |
| 2012/0260337 A1 | 10/2012 | Van der Merwe | |
| 2014/0007238 A1* | 1/2014 | Magee et al. .................. | 726/24 |

OTHER PUBLICATIONS

Cisco Systems, Inc. White Paper DEFEATING DDOS ATTACKS Copyright © 1992-2004.*
Yi, et al., "Source-Based Filtering Scheme against DDOS Attacks", In International Journal of Database Theory and Application, Dec. 2008, 12 pages.
Hong, et al., "Populated IP Addresses—Classification and Applications", In ACM Conference on Computer and Communications Security, Oct. 16, 2012, 12 pages.
Baldi, et al., "Service-based Traffic Classification: Principles and Validation", In 32nd International Conference on Sarnoff Symposium, Mar. 30, 2009, 6 pages.
Dahmouni, et al., "A Markovian Signature-Based Approach to IP Traffic Classification", In 3rd annual ACM workshop on Mining Network, Jun. 7, 2007, 6 pages.

* cited by examiner

*Primary Examiner* — Kambiz Zand
*Assistant Examiner* — Benjamin Kaplan
(74) *Attorney, Agent, or Firm* — Shook, Hardy & Bacon L.L.P.

(57) ABSTRACT

Systems, methods, and computer storage media for traffic segmentation in prevention of DDoS attacks are provided. Data associated with one or more users of a particular service or network is collected. Legitimate properties associated with the data are identified. In embodiments, the legitimate properties are shared with one or more related services. One or more requests are received for the service or related services and request properties are identified. The legitimacy of the one or more requests is predicted based on a comparison of the legitimate and request properties.

20 Claims, 3 Drawing Sheets

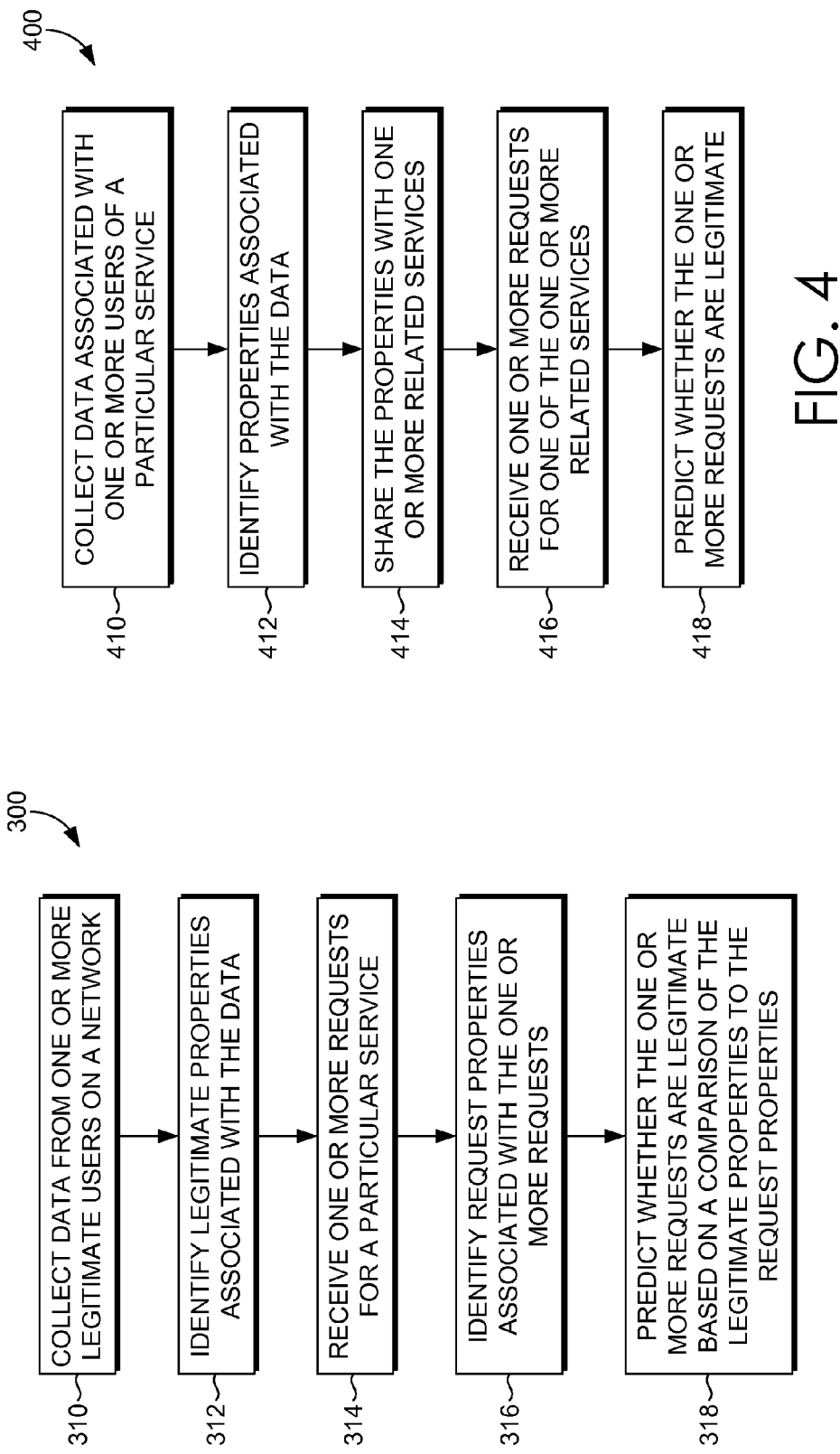

TRAFFIC SEGMENTATION IN PREVENTION OF DDOS ATTACKS

BACKGROUND

Coordinated distributed denial of service attacks (DDoS) threaten to prevent access to sites and services of major organizations. The DDoS attacks operate by consuming valuable resources on an attacked site or service. Simple tools such as internet protocol (IP) filtering are incapable of accurately differentiating between valid and malicious requests. More complicated approaches attempt to identify individual attacks, but these approaches are unable to prevent attacks originating from potentially legitimate machines that are manipulated through Trojan horse-style malware.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer storage media for, among other things, utilizing IP traffic segmentation to prevent DDoS attacks. Data associated with one or more users is collected. Properties associated with the data are identified and are utilized to create sets of learned rules. After a request is received and request properties associated with the request, a prediction is made whether the request is legitimate based on applying the learned rules to the request properties.

BRIEF DESCRIPTION OF THE DRAWINGS

The present invention is described in detail below with reference to the attached drawing figures, wherein:

FIG. 3 is a flow diagram showing a method for utilizing IP traffic segmentation to prevent DDoS attacks, in accordance with an embodiment of the present invention; and FIG. 4 is a flow diagram showing a method for utilizing IP traffic segmentation to prevent DDoS attacks, in accordance with an embodiment of the present invention.

DETAILED DESCRIPTION

Figure 1:
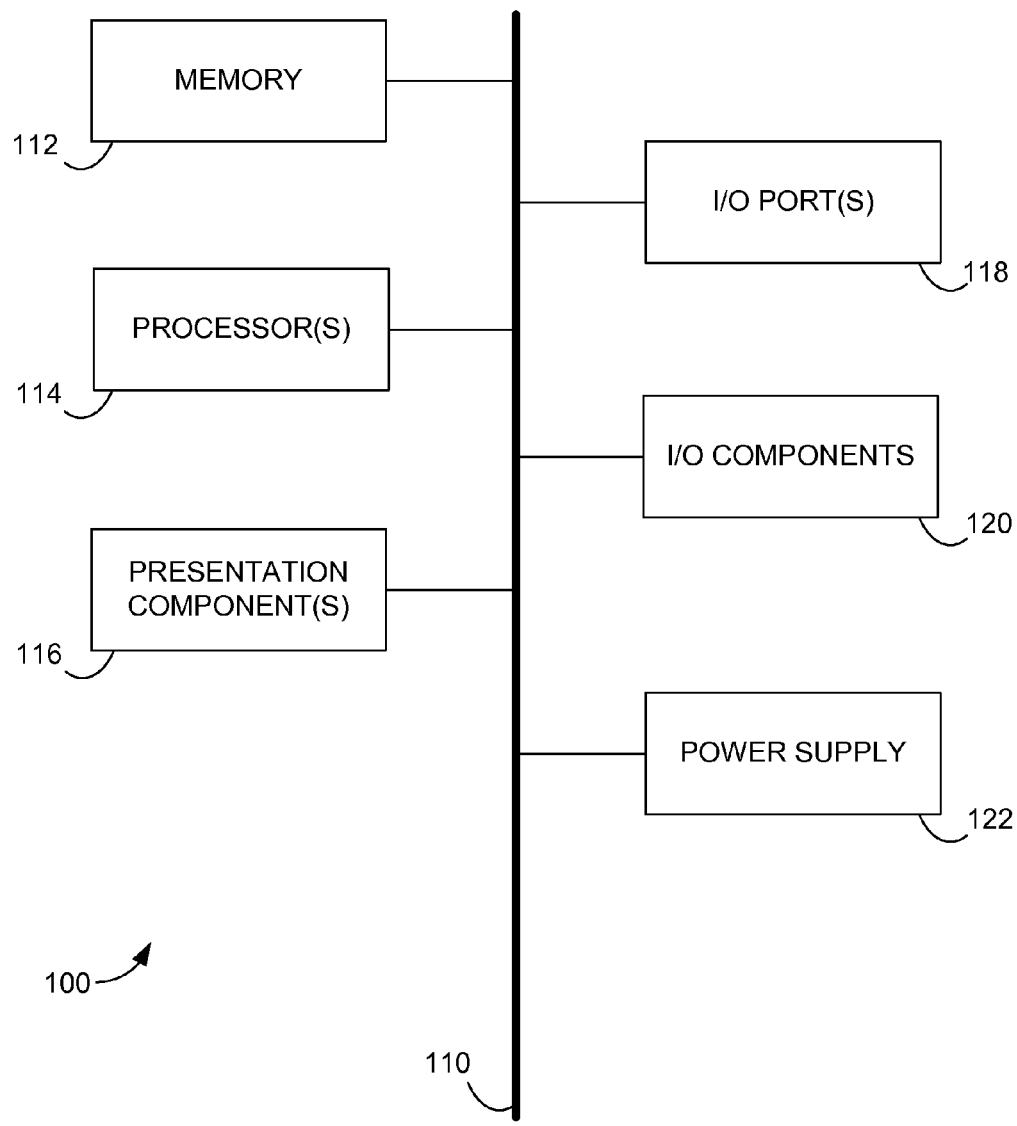
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer storage media for, among other things, utilizing IP traffic segmentation to prevent DDoS attacks. In this regard, traffic data is collected for a particular service and classification and segmentation techniques are applied to predict whether a particular IP address is likely to legitimately access another service. An illegitimate IP address, user, or request refers to an IP address, user, or request likely associated with a DDoS attack. As described herein, degrees of such likelihood may be identified by embodiments of the present invention. Requests, as described herein, refer to specific packets associated with a request or the request itself (e.g., HTTP, TCP, UDP, etc.).

Accordingly, one embodiment of the present invention is directed to one or more computer storage media having computer-executable instructions embodied thereon that, when executed by one or more computing devices, cause the one or more computing devices to perform a method of utilizing IP traffic segmentation to prevent DDoS attacks. The method includes collecting data from one or more legitimate users on a network; identifying legitimate properties associated with the data; utilizing the legitimate properties to create a set of learned rules; receiving one or more requests for a particular service; identifying request properties associated with the one or more requests; and predicting whether the one or more requests are legitimate based on applying the set of learned rules to the request properties.

In another embodiment, the present invention is directed to one or more computer storage media having computer-executable instructions embodied thereon that, when executed by one or more computing devices, cause the one or more computing devices to perform a method of utilizing IP traffic segmentation to prevent DDoS attacks. The method includes collecting data associated with one or more users of a particular service; identifying properties associated with the data; sharing the properties with one or more related services; receiving one or more requests for one of the one or more related services; and predicting whether the one or more requests is legitimate based on the properties.

In yet embodiment, the present invention is directed to a computer system that facilitates utilizing internet protocol (IP) traffic segmentation to prevent distributed denial of service (DDoS) attacks. The computer system comprises a processor coupled to a computer storage medium, the computer storage medium having stored thereon a plurality of computer software components executable by the processor. The computer software components comprise a data component that collects data associated with one or more users; a property component that identifies properties associated with the data; a request component that receives one or more requests; a prediction component that predicts whether the one or more requests are legitimate.

Having briefly described an overview of embodiments of the present invention, an n exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network.

In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

With continued reference to FIG. 1, computing device 100 includes a bus 110 that directly or indirectly couples the following elements: memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer storage media in the form of volatile and/or nonvolatile memory. The memory may be removable, non-removable, or a combination thereof. Exemplary hardware devices include solid state memory, hard drives, optical disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components 120 include a microphone, joystick, game pad, satellite dish, scanner, printer, wireless device, etc.

Figure 2:
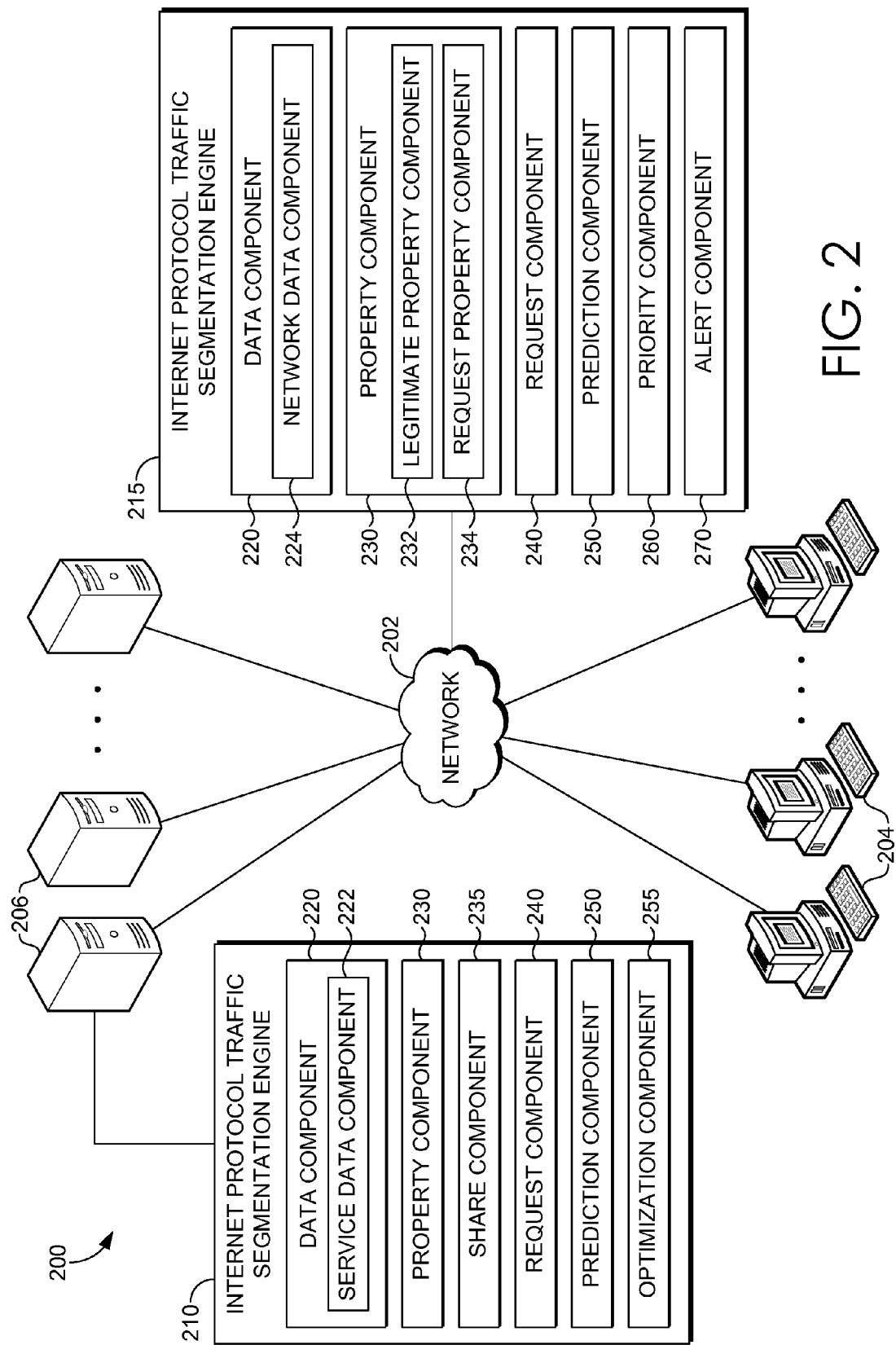
FIG. 2 schematically shows a network environment suitable for performing embodiments of the invention.

With reference to FIG. 2, a block diagram is illustrated that shows an exemplary computing system architecture 200 configured for use in implementing embodiments of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single module/component or combination of modules/components illustrated therein.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The computing system architecture 200 includes a network 202, one or more user device 204, one or more service providers 206, a classifier server 208, and an IP traffic segmentation engine 210, 215. The network 202 includes any computer network such as, for example and not limitation, the Internet, an intranet, private and public local networks, and wireless data or telephone networks. The user device 204 is any computing device, such as the computing device 100, from which a search query can be initiated. For example, the user device 204 might be a personal computer, a laptop, a server computer, a wireless phone or device, a personal digital assistant (PDA), or a digital camera, among others. In an embodiment, a plurality of user devices 204, such as thousands or millions of user devices 204, is connected to the network 202.

The IP traffic segmentation engine 210 and a service provider 206 are integrated, in one embodiment, in a single computing device. In another embodiment, the IP traffic segmentation engine 215 is in communication with one or more service providers 206 via the network 202. This particular embodiment may be provided, for example, by an internet services provider (ISP) or data center service provider to a variety of end users supporting many different related or distinct services.

The service provider 206 includes any computing device, such as the computing device 100, and provides any number or type of services. In an embodiment, a group of related service providers 206 share or distribute the functionalities for the IP traffic segmentation engine 210.

IP traffic segmentation engine 210, 215 comprises data component 220, property component 230, request component 240, and prediction component 250. In various embodiments, IP traffic segmentation engine 210 includes share component 235 and optimization component 255. In one embodiment, data component 220 of IP traffic segmentation engine 210 includes service data component 222. In various embodiments, IP traffic segmentation engine 215 includes priority component 260 and alert component 270. In one embodiment, data component 220 of IP traffic segmentation engine 215 includes network data component 224. In one embodiment, property component 230 of IP traffic segmentation engine 215 includes legitimate property component 232 and request property component 234.

In one implementation, IP traffic segmentation engine 210 is associated with a service provider 206 or a group of related service providers 206 (i.e., service implementation). In this regard, IP traffic segmentation engine 210 is integrated into the service provider 206 or has its functionalities shared or distributed by the group of related service providers 206.

In another implementation, IP traffic segmentation engine 215 is associated with a particular ISP or managed or cloud services provider that provides network access to a group of related service providers 206 (i.e., network implementation). In this regard, IP traffic segmentation engine 215 monitors requests for a particular service associated with the network as well as IP addresses and users associated with the requests.

Data component 220 collects data associated with one or more users. In the service implementation, data component 220 includes, in one embodiment, a service data component 222 that collects data associated with one or more users of a particular service. In the network implementation, data component 220 includes, in one embodiment, network data component 224 that collects data associated with one or more users of the network. The data allows IP traffic segmentation engine 210, 215 to identify and maintain information about the users of a particular service or the network, respectively.

Property component 230 identifies properties associated with the data. The property component includes, in one embodiment, legitimate property component 232 that identifies legitimate properties associated with the data. Legitimate properties positively identify properties of legitimate users associated with the network or service. In one embodiment, property component 230 utilizes the properties (i.e., legitimate properties) to create a set of learned rules. The learned rules identify certain properties or a certain range associated with the properties that are expected for legitimate traffic or requests (i.e., not or not likely associated with a DDoS attack). The property component includes, in one embodiment, request property component 234 for identifying request properties associated with the one or more requests. Request properties identify properties associated with requests made to the network or service. Request properties may or may not be legitimate.

The properties help IP traffic segmentation engine 210, 215 define segments associated with users of a service or network. The segments demonstrate distinct behavior associated with the users. For example, properties associated with one group of users may define a segment that utilizes financial services websites. Another segment may define a group of users that frequently attempt failed logins. Another segment may define a group of users in a geographic location that a particular service targets or services. Another segment may define a group of users that utilizes a particular language relevant. As can be appreciated, many different segments may be defined that incorporate certain characteristics or behavior that is relevant to a service provider or network. Such characteristics may be indicative of normal characteristics or behavior for that service provider or network. Likewise, such characteristics may be indicative of suspicious or malicious characteristics (e.g., DDoS attack) or behavior that the service provider or network wishes to avoid or prioritize lower than normal IP traffic.

In one embodiment, share component 235 shares the properties with one or more related services or service providers. In one embodiment, the related services are a loosely organized or affiliated group of service providers who desire to share or distribute responsibilities for implementing embodiments of the present invention. In another embodiment, the related services share a common ISP or managed or cloud services provider. The shared data allows, for example, the particular service and the related services to compare properties associated with users of their services. These properties can be used to determine what properties should be associated with a legitimate user so that illegitimate users or partial illegitimate can be properly identified and DDoS attacks can be prevented, thwarted, or contained by prioritizing traffic to and from the services or network accordingly. In one embodiment, the properties are optimized for the one or more related services by only sharing properties optimized to protecting assets of each of the one or more related services. This allows each service provider to only receive properties relevant to segments associated with a particular service so that privacy of the users may be maintained where possible.

Request component 240 receives one or more requests. In one embodiment, the requests are received for a particular service. In one embodiment, the requests are received for one or more related services. In one embodiment, the requests are received for a network. As described herein, properties associated with the requests are received by property component 230, in one embodiment, or request property component 230, in another embodiment.

Prediction component 250 predicts whether the one or more requests are legitimate. In one embodiment, prediction component 250 predicts whether the one or more requests are legitimate based on a comparison of the legitimate properties to the request properties. In another embodiment, prediction component 250 predicts whether the one or more requests are legitimate based on whether properties associated with the request indicate the IP address or user belongs to a segment associated with the network or service. In one embodiment, prediction component 250 predicts whether the one or more requests are legitimate by applying the set of learned rules to the request properties to identify whether any request properties fall outside of a range associated with an expected property for known, legitimate requests.

In one embodiment, priority component 260 priorities traffic for the network or service based on the prediction of the one or more requests. For example, traffic that is associated with a segment or segments associated with the network or particular service being requested may be given higher priority than traffic that is not associated with a segment or segments associated with the network or particular service. Priority may be weighted based on the number or percentage of segments associated with the traffic that matches with the segment or segments associated with the network or particular service. In one embodiment, priority component 260 prevents traffic for the network or service if it is predicted to be associated with a potential DDoS attack. In one embodiment, alert component 270 alerts a particular network or a particular service and similar services if a DDoS attack is suspected.

Referring now to FIG. 3, a flow diagram illustrates a method for utilizing IP traffic segmentation to prevent DDoS attacks, in accordance with an embodiment of the present invention. At step 310, data from one or more legitimate users on a network is collected. In one embodiment, the network is an ISP supporting one or more service providers. The service providers provide one or more services accessible by the network. In another embodiment, the network is an infrastructure provided by a managed or cloud services provider. In this regard, the network also supports one or more service providers and the service providers provide one or more services. The network may also be a loosely organized or affiliated group of service providers who desire to share or distribute responsibilities for implementing embodiments of the present invention. In this regard, the service provides may provide one or more related services or services that support similar users or requests. The data is, in various embodiments, data associated with an IP address, a user, an operating system, a browser, a language, a patch level, sign-on attempts, types of services accessed or visited, and the like. In one embodiment, the data is segmented according user behavior or characteristic or to the network or type or category of service provided by the service providers. This allows data to be kept separate from unrelated or irrelevant data which protects the privacy of the users.

Legitimate properties associated with the data are identified at step 312. In various embodiments, legitimate properties include successful sign-on attempts, verified user status, non-malicious use of a service, and the like. For example, if a particular IP address or user frequently visits a financial service (e.g., MSN Money, Yahoo Finance, etc.) for legitimate purposes, that particular IP address or user may be flagged as a typical or legitimate user of websites providing financial services. Accordingly, in one embodiment, a legitimate property of data associated with the IP address or user is identified that reflects that the particular IP address or user visits websites providing financial services. In another embodiment, a legitimate property is that the particular IP address or user is also often associated with successful sign-on attempts to a particular service. In another embodiment, the legitimate property is a language associated with the particular IP address or user (e.g., English). As can be appreciated, any number or type of properties associated with the data may be identified as legitimate properties. In various embodiments, the legitimate properties include operating system, browser, patch level, and the like. In one embodiment, the legitimate properties are utilized to create a set of learned rules. The set of learned rules are rules that associate the legitimate properties with typical or legitimate requests for the particular service. In other words, the set of learned rules identify properties or similar properties that should be expected for the particular service.

At step 314, one or more requests for a particular service are received. The request may be triggered by accessing the homepage of a particular website hosting the particular service or may be triggered by attempting to login to or access the particular service. Request properties associated with the one or more requests are identified at step 316. For example, in one embodiment, the request property is a particular type of service (e.g., financial service). In another embodiment, the request property is a login attempt for a particular service. In another embodiment, the request property is particular geographic location. In another embodiment, the request property is a particular language. In various embodiments, the request properties include operating system, browser, patch level, and the like.

It is predicted, at step 318, whether the one or more requests are legitimate based on a comparison of the legitimate properties to the request properties. In other words, after a request for a particular service is received, the request properties associated with the request can be compared legitimate properties associated with legitimate users of the network. For example, if legitimate users of the network are associated with IP address in a particular geographic location, and a request is received that includes a request property associated with a different geographic location, that particular request may be predicted as illegitimate. On the other hand, if the request includes a request property associated with the same geographic location, that particular request may be predicted as legitimate. In various embodiments, the prediction includes degrees of legitimacy to accommodate for situations where a percentage of the legitimate properties compare favorably to the request properties, but not all. In one embodiment, it is predicted whether the one or more requests are legitimate based on applying the set of learned rules to the request properties.

In one embodiment, traffic is prioritized for the network based on the prediction of the one or more requests. This allows traffic that is more likely to be legitimate to be given higher priority than traffic that is predicted to be illegitimate. Similarly, traffic with a higher predicted degree of legitimacy is given higher priority than traffic with a lower predicted degree of legitimacy.

In one embodiment, the particular service is alerted if a DDoS attack is suspected. For example, the ISP or managed or cloud services provide may detect, based on a configurable number or percentage of illegitimate or lower predicted degree of legitimacy requests, that a DDoS attack is responsible. Accordingly, the ISP or managed or cloud services provider may alert the provider of the particular service or affected network.

In one embodiment, similar services are also alerted of the suspected DDoS attack. For example, if a similar service provides services that are similar to the particular service, the provider of the similar service is alerted accordingly. In one embodiment, the similar service has one or more request properties in common with the particular service. By alerting the similar service, the provider of the similar service is able to take proactive measures or prioritize traffic to prevent the suspected DDoS attack from affecting the similar service. associated request properties.

Referring now to FIG. 4, a flow diagram illustrates a method for utilizing IP traffic segmentation to prevent DDoS attacks, in accordance with an embodiment of the present invention. At step 410, data associated with one or more users of a particular service is collected. The data is, in various embodiments, data associated with an IP address, a user, an operating system, a browser, a language, a patch level, sign-on attempts, types of services accessed or visited, and the like. In one embodiment, the particular service is a service provided by a service provider. In one embodiment, the particular service is a website operated by the service provider. In one embodiment, the data is segmented according to a type or category of service the particular service provides.

Properties associated with the data are identified at step 412. In various embodiments, properties include successful sign-on attempts, verified user status, non-malicious use of a service, and the like. In one embodiment, the properties may indicate how a particular IP address or user associated with the data interacts with the particular service.

At step 414, the properties associated with the particular service are shared with one or more related services. In one embodiment, the related services are a loosely organized or affiliated group of service providers who desire to share or distribute responsibilities for implementing embodiments of the present invention. In another embodiment, the related services share a common ISP or managed or cloud services provider. The shared data allows, for example, the particular service and the related services to compare properties associated with users of their services. These properties can be used to determine what properties should be associated with a legitimate user so that illegitimate users or partial illegitimate can be properly identified and DDoS attacks can be prevented, thwarted, or contained by prioritizing traffic to and from the services or network accordingly.

In one embodiment, the properties are optimized for the one or more related services. In one embodiment, optimizing the properties comprises only sharing properties optimized to protecting assets of each of the one or more related services. This protects user privacy by only sharing properties with a related service provider that is necessary to protect that particular related service provider's assets. For example, suppose an IP address or user is associated with data, and that data includes properties that indicate that IP address or user frequently visits sports related websites and news related websites. The data also includes properties that the only time that IP address or user has visited a particular financial services website, unsuccessful login attempts were the result. Accordingly, the only properties that need to be shared by that particular financial services website with other websites also providing financial services is the properties indicating unsuccessful login attempt for a financial services website. In other words, the traffic and its associated properties are segmented so that only the properties that need to be shared are actually shared.

One or more requests for one of the one or more related services are received at step 416. In one embodiment, properties associated with the requests for the related services are identified. In various embodiments, properties include successful sign-on attempts, verified user status, non-malicious use of a service, and the like. In one embodiment, the properties may indicate how a particular IP address or user associated with the data interacts with the particular service.

Based on a comparison of the properties and the properties associated with the one or more requests, it is predicted, in one embodiment, whether the one or more requests are legitimate. For example, if a particular IP address or user is associated with properties indicating that particular IP address or user has a high number of unsuccessful login attempts at financial services websites, and that IP address or user attempts to login to a related service providing financial services, that particular IP address or user may be predicted as illegitimate. Accordingly, in one embodiment, traffic is prioritized for the related service based on the prediction. In this example, since the particular IP address or user is likely illegitimate, traffic associated with that particular IP address or user is given reduced or no priority, thereby preventing, thwarting, or containing a potential DDoS attack. If a DDoS attack is suspected, in one embodiment, the one or more related services are alerted.

It will be understood by those of ordinary skill in the art that the order of steps shown in the method 300 and 400 of FIGS. 3 and 4 respectively are not meant to limit the scope of the present invention in any way and, in fact, the steps may occur in a variety of different sequences within embodiments hereof. Any and all such variations, and any combination thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. Computer storage media having computer-executable instructions embodied thereon, that when executed by one or more computing devices, cause the one or more computing devices to perform a method of utilizing internet protocol (IP) traffic segmentation to prevent distributed denial of service (DDoS) attacks, the method comprising:
   collecting data from one or more legitimate users on a network;
   identifying legitimate properties associated with the data, the legitimate properties including IP address, successful sign-on attempts, verified user status, or non-malicious use of a service;
   utilizing the legitimate properties to create a set of learned rules;
   receiving one or more requests for a particular service;
   identifying request properties associated with the one or more requests;
   predicting whether the one or more requests are legitimate based on applying the set of learned rules to the request properties.

2. The media of claim 1, further comprising prioritizing traffic for the network based on the prediction of the one or more requests.

3. The media of claim 1, further comprising alerting the particular service if a DDoS attack is suspected.

4. The media of claim 3, further comprising alerting similar services of the suspected DDoS attack.

5. Computer storage media having computer-executable instructions embodied thereon, that when executed by one or more computing devices, cause the one or more computing devices to perform a method of utilizing internet protocol (IP) traffic segmentation to prevent distributed denial of service (DDoS) attacks, the method comprising:
   collecting data associated with one or more users of a particular service;
   identifying properties associated with the data, the properties including IP address, successful sign-on attempts, verified user status, or non-malicious use of a service;
   sharing the properties with one or more related services;

receiving one or more requests for one of the one or more related services; and predicting whether the one or more requests are legitimate.

6. The media of claim 5, further comprising prioritizing traffic for the one of the one or more related services based on the prediction.

7. The media of claim 5, further comprising alerting the one or more related services if a DDoS attack is suspected.

8. The media of claim 5, further comprising optimizing the properties for the one or more related services.

9. The media of claim 8, wherein optimizing the properties comprises only sharing properties optimized to protecting assets of each of the one or more related services.

10. A computer system that facilitates utilizing internet protocol (IP) traffic segmentation to prevent distributed denial of service (DDoS) attacks, the computer system comprising a processor coupled to a computer storage medium, the computer storage medium having stored thereon a plurality of computer software components executable by the processor, the computer software components comprising:

a data component that collects data associated with one or more users;

a property component that identifies properties associated with the data and utilizes the properties to create a set of learned rules, the properties including IP address, successful sign-on attempts, verified user status, or non-malicious use of a service;

a request component that receives one or more requests;

a prediction component that predicts whether the one or more requests are legitimate.

11. The system of claim 10, wherein the data component includes a network data component that collects the data from one or more legitimate users on a network.

12. The system of claim 11, wherein the property component includes a legitimate property component that identifies legitimate properties associated with the data.

13. The system of claim 12, wherein the property component further includes a request property component for identifying request properties associated with the one or more requests.

14. The system of claim 13, wherein the prediction component predicts whether the one or more requests are legitimate based on applying the set of learned rules to the request properties.

15. The system of claim 14, further comprising a priority component that priorities traffic for the network based on the prediction of the one or more requests.

16. The system of claim 15, further comprising an alert component for alerting a particular service and similar services if a DDoS attack is suspected.

17. The system of claim 10, wherein the data component includes a service data component that collects the data associated with one or more users of a particular service.

18. The system of claim 17, further comprising a share component for sharing the properties with one or more related services.

19. The system of claim 18, wherein the request component further receives requests for the one or more related services.

20. The system of claim 19, further comprising an optimization component that optimizes the properties for the one or more related services by only sharing properties optimized to protecting assets of each of the one or more related services.

* * * * *